United States Patent
Muramatsu et al.

(10) Patent No.: US 7,573,428 B2
(45) Date of Patent: Aug. 11, 2009

(54) MIRROR DEVICE WITH ANTENNA

(75) Inventors: Masahiko Muramatsu, Shizuoka (JP); Mitsuyoshi Nagao, Shizuoka (JP); Hidenori Sato, Shizuoka (JP); Takeshi Nakayama, Saitama (JP); Jinichi Inoue, Saitama (JP)

(73) Assignee: Murakami Corporation, Shizuoka-Shi (JP)

( * ) Notice: Subject to any disclaimer, the term of this patent is extended or adjusted under 35 U.S.C. 154(b) by 588 days.

(21) Appl. No.: 11/415,213

(22) Filed: May 2, 2006

(65) Prior Publication Data

US 2007/0024512 A1    Feb. 1, 2007

(30) Foreign Application Priority Data

Jul. 29, 2005    (JP)    ............................. 2005-220666

(51) Int. Cl.
*H01Q 1/32* (2006.01)
*H01Q 3/00* (2006.01)

(52) U.S. Cl. .................. 343/711; 343/713; 343/766; 343/846; 343/829

(58) Field of Classification Search ............. 343/711, 343/713
See application file for complete search history.

(56) References Cited

U.S. PATENT DOCUMENTS

| | | | | |
|---|---|---|---|---|
| 6,902,284 | B2 * | 6/2005 | Hutzel et al. | 359/865 |
| 7,248,225 | B2 * | 7/2007 | Yegin et al. | 343/711 |
| 7,325,953 | B2 * | 2/2008 | Pastrick | 362/511 |
| 7,370,983 | B2 * | 5/2008 | DeWind et al. | 359/844 |
| 2003/0162524 | A1 * | 8/2003 | Schultze | 455/345 |
| 2006/0214862 | A1 * | 9/2006 | Hiroe et al. | 343/713 |
| 2008/0018544 | A1 * | 1/2008 | Rozan | 343/713 |

FOREIGN PATENT DOCUMENTS

| | | |
|---|---|---|
| JP | 5-145319 | 6/1993 |
| JP | 9-246827 | 9/1997 |
| JP | 2004-130875 | 4/2004 |
| JP | 2004-168153 | 6/2004 |

* cited by examiner

*Primary Examiner*—Trinh V Dinh
(74) *Attorney, Agent, or Firm*—Kratz, Quintos & Hanson, LLP (57) ABSTRACT

In a mirror device with an antenna of the present invention the antenna is placed in a mirror housing where a mirror configured to reflect a rear of a vehicle is attached, a grounding portion at least part of which is composed of a conductive material is provided in the mirror housing, and the antenna is electrically connected to the conductive material of the grounding portion.

14 Claims, 8 Drawing Sheets

MIRROR DEVICE WITH ANTENNA

BACKGROUND OF THE INVENTION

1. Field of the Invention

The present invention relates to a mirror device with an antenna in which the antenna (for example, a giga hertz band antenna including such a satellite broadcasting receiving antenna for receiving an XM radio and a mobile broadcasting in the mirror device of a vehicle) is built.

2. Description of the Related Art

Conventionally, it is common to place a giga hertz band antenna (hereinafter referred to as antenna) used in such a satellite broadcasting receiving antenna on a roof of a vehicle or a trunk assumed to be best in performance. However, if placing the antenna on such a roof of a vehicle as above, there is a trouble that an appearance of the vehicle becomes worse because the antenna and a cable therefor can be seen by a user. In addition, if placing the antenna on such a roof of a vehicle, there is also a problem that a sound of cutting wind occurs in running. Consequently, in order to solve such the problems is recently suggested a method of storing an antenna inside a door mirror of a vehicle (for example, Japanese Patent Laid-Open Publication Nos. H 9-246827 (paragraphs 0017 and 0018, and FIG. 1), 2004-168153 (paragraphs 0014 and 0019, and FIG. 1), and 2004-130875 (paragraphs 0014 to 0016 and 0022, and FIG. 1).

In this connection, in vehicle door mirror devices described in the three patents, in order to ground an antenna housed in a mirror housing (door mirror case), a grounding cable from the antenna is pulled all the way from within the mirror housing to outside and is connected to a door or a mirror base (door mirror stay). Therefore, a work of pulling the cable all the way in assembling a vehicle becomes a troublesome work, and there exists a problem that a workability lowers.

In addition, because a through hole cannot but be drilled through such a mirror housing and a mirror base in order to pull a grounding cable all the way from the mirror housing to outside, there also exists a problem that not only a structure of a vehicle door mirror device becomes complicated but also manufacturing cost becomes expensive.

Consequently, a mirror device with an antenna is strongly requested that can make it unnecessary or simple a work of pulling a grounding cable all the way from a mirror housing to outside in order to ground the antenna, improve a workability in assembling a vehicle, and simplify a whole structure and suppress manufacturing cost cheaper.

SUMMARY OF THE INVENTION

In view of the problems the inventors et al. have devoted themselves to a study; discovered that a conductive material can be used as grounding, and a receiving performance (gain, deviation (ripple), and the like) of an antenna for an electric wave can be stably maintained, only by electrically connecting the antenna in a mirror housing to the conductive material provided therein; and completed the present invention.

In other words, a first aspect of the present invention that has solved the problems is a mirror device with an antenna, wherein the antenna is placed in a mirror housing where a mirror configured to reflect a rear of a vehicle is attached; and a grounding portion at least part of which is composed of a conductive material is provided in the mirror housing, and the antenna is electrically connected to the conductive material of the grounding portion.

In accordance with the first aspect of the present invention, it is enabled to ground an antenna and enhance a receiving performance of the antenna for an electric wave only by electrically connecting the antenna placed in a mirror housing to a conductive material of a grounding portion. Therefore, it is enabled to make it unnecessary to penetrate a grounding cable from the antenna to the mirror housing, to pull the cable all the way to such a door of a vehicle, and to connect the cable. Meanwhile, the antenna may be adapted to electrically directly contact the conductive material of the grounding portion or to be connected to the conductive material of the grounding portion through the cable.

In a second aspect of the present invention a grounding portion is disposed lower than an antenna.

In accordance with the second aspect of the present invention, because a grounding portion is disposed lower than an antenna, a direction characteristic becomes better at an elevation angle from about zero degree to about 90 degrees, and thus it is enabled to stably and sensitively receive an electric wave sent from any of above and oblique above of the antenna without receiving an electric wave interference.

A third aspect of the present invention is a mirror device with an antenna comprising: a mirror base fixed on a vehicle; a mirror housing rotatably provided at a shaft vertically provided at the mirror base, wherein a mirror configured to reflect a rear of the vehicle is attached; a motor provided in the mirror housing and configured to rotate the mirror housing around an axial direction of the shaft; and the antenna placed in the mirror housing, wherein a grounding case that covers the motor from outside and at least part of which is composed of a conductive material is provided in the mirror housing, and the antenna is electrically connected to the conductive material of the grounding case.

In accordance with the third aspect of the present invention, it is enabled to simply ground an antenna and enhance a receiving performance of the antenna for an electric wave only by connecting the antenna to a conductive material of a grounding case configured to cover a motor from outside. Therefore, same as in the first aspect of the present invention, it is enabled to make it unnecessary to penetrate a grounding cable from the antenna to the mirror housing, to pull the cable all the way to such a door of a vehicle, and to connect the cable.

In a fourth aspect of the present invention a conductive material is a plate composed of a metal material and a grounding case is formed with the plate.

In accordance with the fourth aspect of the present invention, because a whole of a grounding case is formed with a plate composed of a metal material, it is enabled to widely ensure a grounding area of an antenna.

In a fifth aspect of the present invention a plate is formed with a copper plate.

In accordance with the fifth aspect of the present invention, a whole of a grounding case is formed with a copper plate excellent in conductivity, it is enabled to further enhance a receiving performance of an antenna for an electric wave by connecting the antenna to the grounding area.

In a sixth aspect of the present invention a conductive material is a plate of which a surface of a resin material is plated with a metal material, and a grounding case is formed with the plate.

In accordance with the sixth aspect of the present invention, because a whole of a grounding case is formed with a plate of which a surface of a resin material is plated with a metal material, it is enabled to widely ensure a grounding area of an antenna.

In a seventh aspect of the present invention a grounding case comprises a side portion configured to surround a periphery of a motor from outside and a lid portion configured to close an upper end of the side portion, wherein an antenna is placed and fixed on an upper face of the lid portion of the grounding case.

In accordance with the seventh aspect of the present invention, because a grounding case is formed as a cylindrical body consisting of a side portion and a lid portion, it is enabled to widely ensure a placement space of an antenna on an upper face of the lid portion of the grounding case. In addition, by placing the antenna on the upper face of the lid portion of the grounding case, it is enabled to dispose the grounding case at a lower position than the antenna, and same as in the second aspect of the present invention, it is enabled to enhance a receiving performance of the antenna for an electric wave.

An eighth aspect of the present invention is a mirror device with an antenna comprising: a mirror base fixed on a vehicle; a mirror housing rotatably provided at a shaft vertically provided at the mirror base, wherein a mirror configured to reflect a rear of the vehicle is attached; a motor provided in the mirror housing and configured to rotate the mirror housing around an axial direction of the shaft; and the antenna placed in the mirror housing, wherein a grounding case comprising a side portion configured to surround a periphery of the motor from outside and a lid portion configured to close an upper end of the side portion is provided in the mirror housing, an antenna bracket that is composed of a metal material or of which a surface of a resin material is plated with the metal material is fixed on an upper face of the lid portion of the case, the antenna is placed on the antenna bracket, and thus the antenna bracket and the antenna are electrically connected.

In accordance with the eighth aspect of the present invention, because an antenna bracket that is composed of a metal material or of which a surface of a resin material is plated with the metal material is fixed on an upper face of a lid portion of a grounding case, it is enabled to simply ground an antenna by the antenna bracket and to enhance a receiving performance of the antenna for an electric wave only by placing the antenna at the antenna bracket.

In a ninth aspect of the present invention an antenna bracket is an approximately rectangular flat plate having an area not less than at least about 1750 mm$^2$.

In accordance with the ninth aspect of the present invention, it is enabled to sufficiently ensure a grounding area of an antenna by an antenna bracket and to enhance a receiving performance of the antenna for an electric wave.

In a tenth aspect of the present invention, at least part of a grounding case is formed with a conductive material, and the conductive material and an antenna bracket are electrically connected.

In accordance with the tenth aspect of the present invention, it is enabled to utilize a grounding case, at least part of which is a conductive material, as grounding of an antenna together with an antenna bracket, and to further enhance a receiving performance of the antenna for an electric wave.

In an eleventh aspect of the present invention, wiring led out from an antenna is connected to a tuner for the antenna mounted on a vehicle through a through hole formed with penetrating inside of a shaft in an axial direction.

In accordance with the eleventh aspect of the present invention, because wiring led out from an antenna is connected to a tuner for the antenna through a through hole of a shaft, it is enabled to easily perform a wiring work of the wiring.

BEST MODES FOR CARRYING OUT THE INVENTION

First Embodiment

Here will be described a first embodiment of the present invention in detail, referring to drawings as needed.

Figure 1:
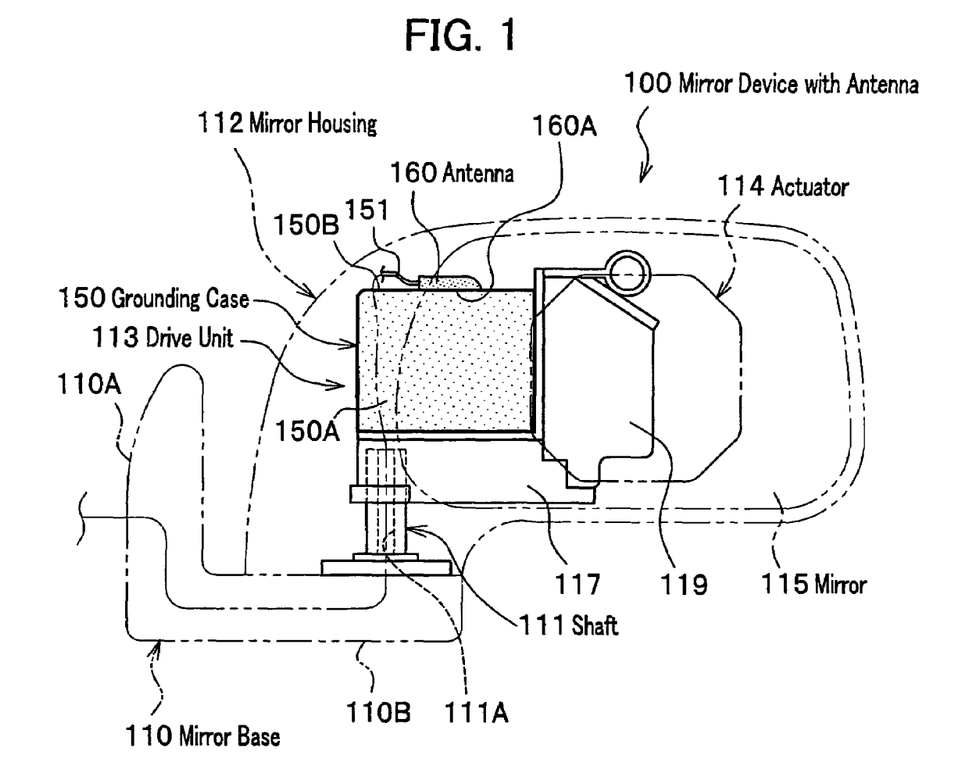
FIG. 1 is a front view showing an inner structure of a mirror device with an antenna related to a first embodiment of the present invention.
Figure 2:
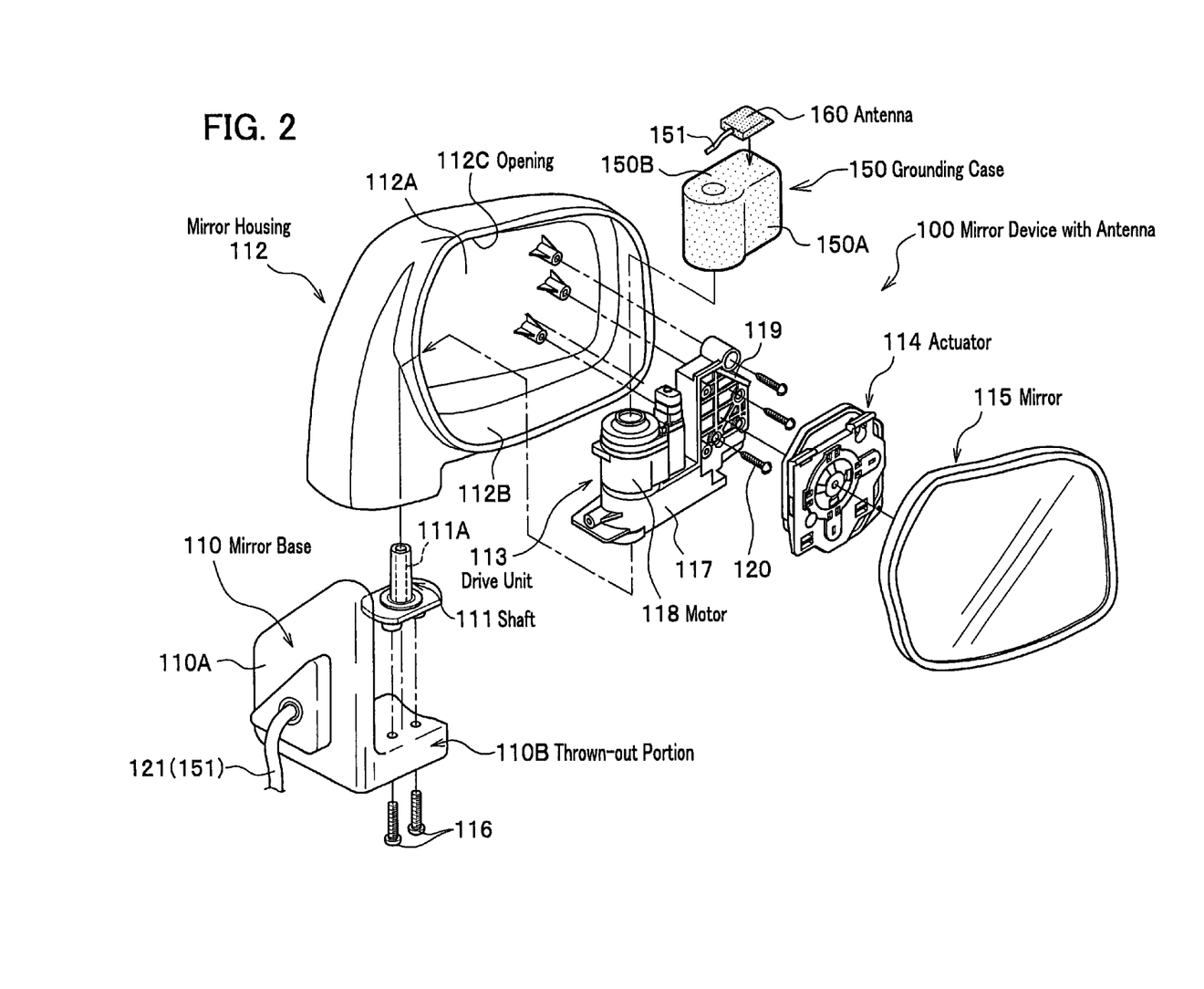
FIG. 2 is an exploded perspective view showing the mirror device with the antenna related to the first embodiment.

As shown in FIGS. 1 and 2, a mirror device 100 with an antenna (only right is shown) used in the embodiment is configured as a so called tiltable door mirror loaded on a door (not shown) of a vehicle. The mirror device 100 generally comprises a mirror base 110, a mirror shaft 111, a mirror housing 112, a drive unit 113, an actuator 114, a mirror 115, a grounding case 150, and an antenna 160.

Here, the mirror base 110 comprises a fixation portion 110A fixed at a door of a vehicle and a thrown-out portion 110B thrown out from a lower end to right. The shaft 111 is vertically provided at the thrown-out portion 110B of the mirror base 110 with such screws 116, 116, and a through hole 111A configured to insert such a coaxial cable 151 described later is formed inside the portion 110B with penetrating it in an axial direction thereof.

The mirror housing 112 is formed with an insulation material such as a resin material, and comprises a bottom portion 112A and a side wall 112B. In addition, the mirror housing 112 comprises an opening 112C configured to house therein various components such as the drive unit 113, the actuator 114, and the antenna 160.

The drive unit 113 comprises a base 117 composed of an insulation material such as a resin material, a motor 118 placed at a left portion of the base 117, and a frame 119 placed at a right portion of the base 117, wherein the frame 119 is integrally fixed on the bottom portion 112A of the mirror housing 112 with screws 120 and the like. Then the shaft 111 is connected to a drive shaft (not shown) of the motor 118, and by driving the motor 118, it is adapted that: the mirror housing 112 rotates around the shaft 111 with respect to the mirror base 110; and thus a storage position and a use position are a restored.

A back face (front face) of the actuator 114 is fixed at the frame 119 of the drive unit 113. The actuator 114 tiltingfreely adjusts the mirror 115 in up/down directions and left/right directions by drive of the actuator 114. The mirror 115 is adapted to be disposed so as to close the opening 112C of the mirror housing 112 and to reflect the rear of the vehicle. In addition, a cable 121 configured to supply power to the actuator 114 and the motor 118 passes the through hole 111A of the shaft 111 and inside of the mirror base 110, and is connected to a battery (not shown) of the vehicle together with the coaxial cable 151 of the antenna 160 described later.

Next will be described the grounding case 150 and the antenna 160 in detail, referring to FIGS. 1 to 3.

Figure 3:
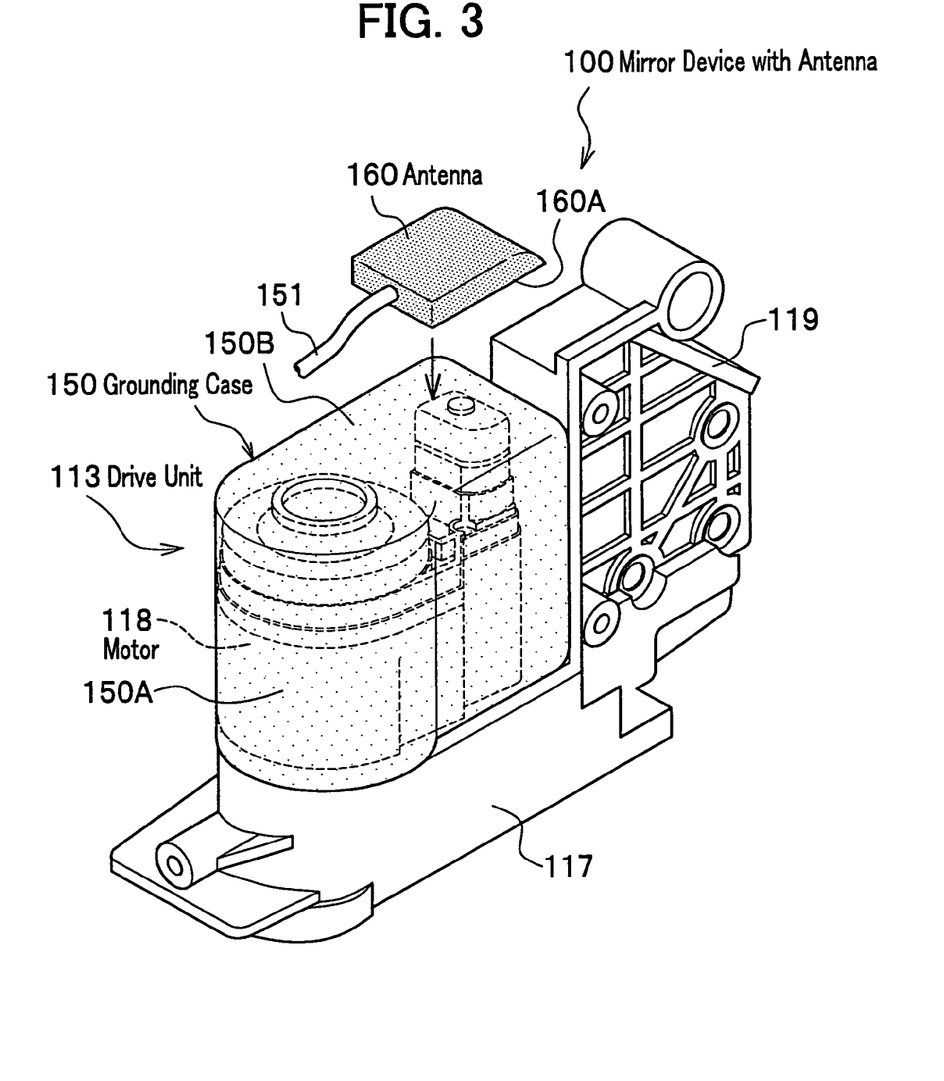
FIG. 3 is an exploded perspective view enlargedly showing a state of a grounding case in FIG. 2 being loaded in a drive unit, together with the antenna.
Figure 4:
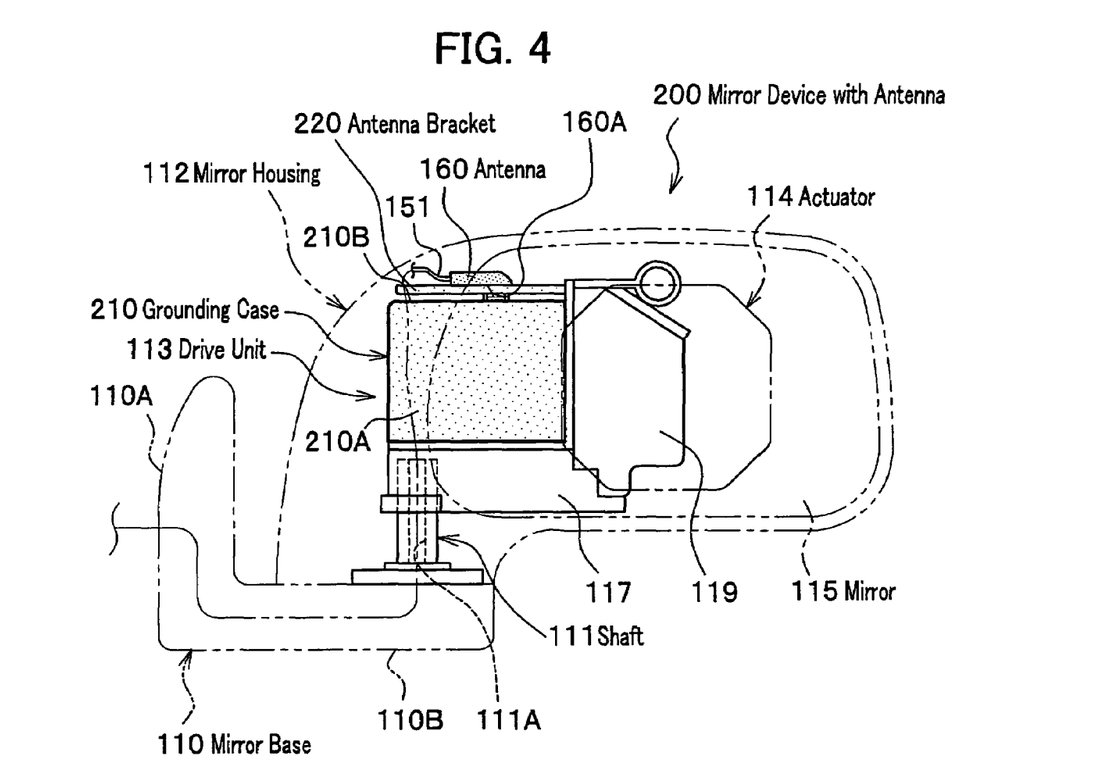
FIG. 4 is a front view showing an inner structure of a mirror device with an antenna related to a second embodiment of the present invention.

As shown in FIG. 3, the grounding case 150 is formed as a cylindrical body with a lid for covering the motor 118 from outside by dispensing such a press process to a plate, preferably a copper plate, composed of a conductive material such as a metal material. Meanwhile, the grounding case 150 may also be formed with a plate of which a surface of a resin material is plated with a conductive material such as a metal material. In addition, the grounding case 150 comprises a rectangular cylindrical side portion 150A configured to surround a periphery of the motor 118 from outside and an approximately rectangular lid portion 150B configured to close an upper end of the side portion 150A. In addition, in the grounding case 150 a lower end of the side portion 150A is fixed by adhesion or caulking, for example, on such an upper face of the base 117 of the drive unit 113. In addition, the grounding case 150 brings out a function as grounding for the antenna 160. In addition, by surrounding the motor 118 and performing hermetic sealing between the motor 118 and the base 117, the grounding case 150 combinedly has a function as a seal cap of blocking an invasion of dust, moisture, and the like from outside and protecting the motor 118.

The antenna 160 is configured with such a known vehicle-flat-plate-form antenna disclosed, for example, in Japanese Patent Laid-Open Publication No. H 5-145319, and is used in an antenna, for example, for a SDARS (Satellite Digital Audio Radio Service).

In the antenna 160 is built such an antenna element (not shown) configured to receive an electric wave from outside. In addition, to the antenna 160 is connected the coaxial cable 151 of wiring configured to supply power to the antenna element; and the coaxial cable 151 passes inside of the mirror base 110 via the through hole 111A of the shaft 111 as shown in FIG. 1 and is connected to a tuner (not shown) placed in the vehicle. Meanwhile, to the antenna 160 may also be connected a single axial cable instead of the coaxial cable 151.

Here, as shown in FIG. 1, the antenna 160 comprises a bottom plate 160A composed of a metal plate, and the bottom plate 160A is electrically connected to the antenna element. In addition, the bottom plate 160A of the antenna 160 is placed on an upper face of the lid portion 150B of the grounding case 150, and at this state, the antenna 160 is firmly fixed on the portion 150B with such a conductive adhesive. Therefore, the antenna element of the antenna 160 is electrically connected to the grounding case 150 through the bottom plate 160A composed of the metal plate. In addition, the grounding case 150 of a grounding portion is adapted to be disposed lower than the antenna 160. As the result, the antenna 160 results in being grounded by the grounding case 150. Meanwhile, the antenna 160 may also be fixed on the lid portion 150B of the grounding case 150 with such a screw.

In accordance with the embodiment thus configured, because the antenna 160 is adapted to be directly fixed on the lid portion 150B of the grounding case 150 made of copper, it is enabled to save a trouble of pulling a cable configured to ground the antenna 160 all the way from the antenna 160 to outside of the mirror housing 112 and of connecting the cable to such a door of the vehicle.

Accordingly, it is enabled to simplify a wiring work around the antenna 160 and improve a workability in assembling the vehicle. In addition, it is enabled to make it unnecessary such a drilling process for pulling the cable all the way from the mirror housing 112 to outside, to simplify a whole structure of the mirror device 100 with the antenna, and to suppress manufacturing cost cheaper.

In addition, because the grounding case 150 is disposed lower than the antenna 160, for example, when receiving an electric wave sent from any of above and oblique above of the antenna 160, it is enabled to prevent a defect of the electric wave being interfered with the grounding case 150. Therefore, it is enabled to stably receive the electric wave by the antenna 160.

In addition, because a whole of the grounding case 150 can be used as grounding of the antenna 160, it is enabled to sufficiently widely ensure a grounding area of the antenna 160 and to further enhance a receiving performance of the antenna 160 for an electric wave by appropriately setting a surface area of the whole of the grounding case 150.

Furthermore, because the grounding case 150 is formed as a cylindrical body with a lid, it is enabled to widely ensure a placement space for the antenna 160 on the upper face of the lid portion 150B of the grounding case 150 and to easily design a layout of the antenna 160.

Second Embodiment

In a second embodiment a same symbol will be appended to a same component as in the first embodiment, and a description thereof will be omitted.

Figure 5:
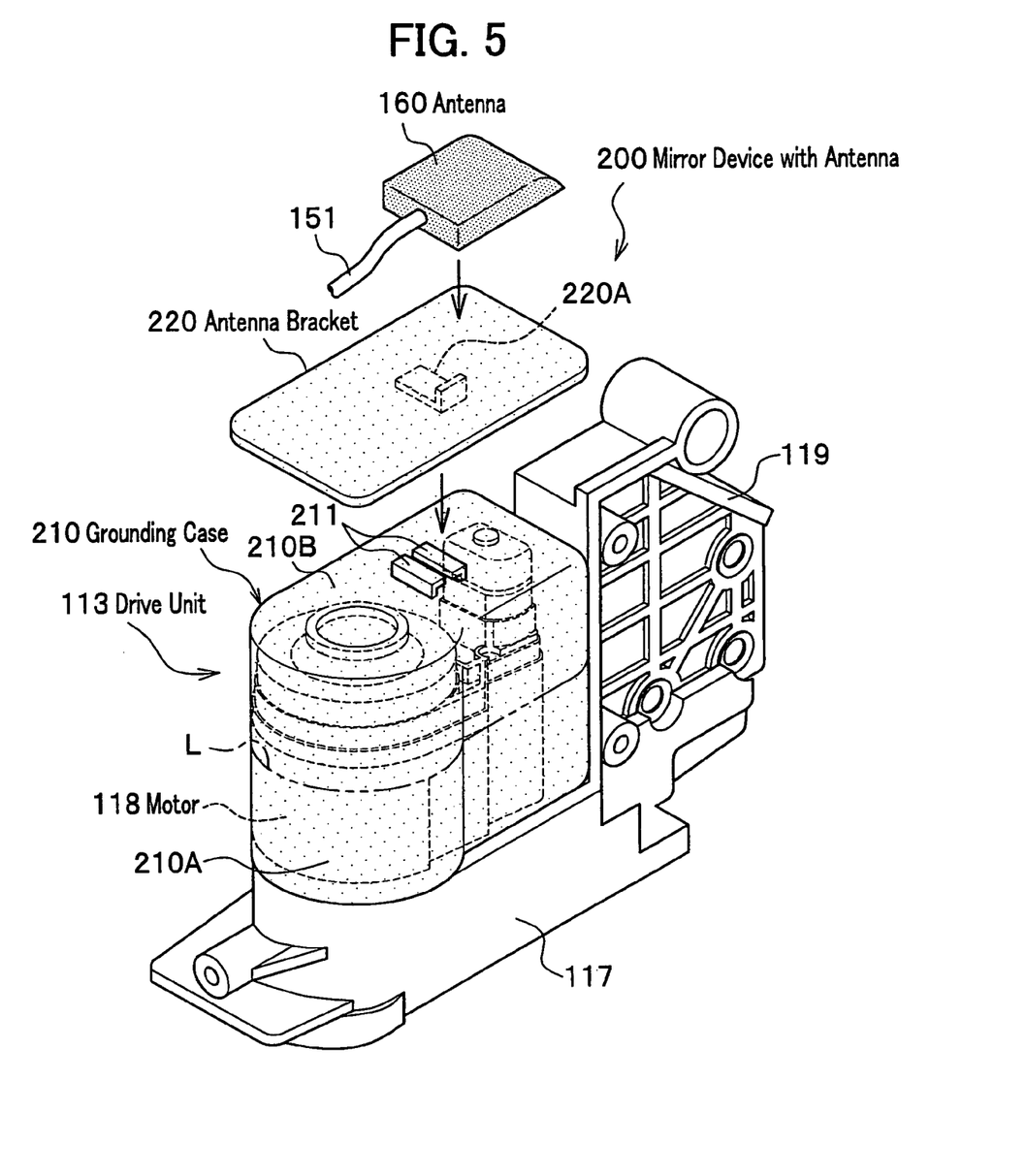
FIG. 5 is an exploded perspective view enlargedly showing a drive unit, a grounding case, and the antenna in FIG. 4.

As shown in FIG. 5, a mirror device 200 with an antenna related to the embodiment generally comprises the drive unit 113, the antenna 160, a grounding case 210, an antenna bracket 220, a mirror base, a mirror housing, an actuator, and a mirror (each without a number not shown).

The grounding case 210 is formed as a cylindrical body with a lid same the grounding case 150 described in the first embodiment. In addition, the grounding case 210 comprises a rectangular cylindrical side portion 210A configured to surround a periphery of the motor 118 from outside and an approximately rectangular lid portion 210B configured to close an upper end of the side portion 210A. In addition, the grounding case 210 is formed with something of which a surface of a resin material is plated with a conductive material (for example, a metal material such as copper).

However, the embodiment is different from the first embodiment in: a point that a pair of bracket fixation portions 211, 211 composed of respective plates folded into an approximately L-letter form are attached in parallel on an upper face of the lid portion 210B of the grounding case 210; another point that the antenna bracket 220 is attached on the upper face of the lid portion 210B of the grounding case 210 through each of the bracket fixation portions 211, 211; and still another point that the antenna 160 is placed on the antenna bracket 220.

Here, each bracket fixation portion 211 is formed, same as the grounding case 210, with something of which a surface of a resin material is plated with a conductive material (for example, a metal material such as copper) and is fixed on the upper face of the lid portion 210B with a conductive adhesive. Meanwhile, a whole of the bracket fixation portion 211 may also be formed with a conductive material.

The antenna bracket 220 is formed, same as the grounding case 210, with an approximately rectangular plate of which a surface of a resin material is plated with a conductive material (for example, a metal material such as copper). In addition, on the antenna bracket 220 is fixed the antenna 160, for example, with such a conductive adhesive. Meanwhile, the antenna bracket 220 is set to be an area preferably not less than at least about 35 mm×50 mm (1750 mm$^2$), more preferably not less than about 50 mm×50 mm (2500 mm$^2$).

In addition, at center of a lower face of the antenna bracket 220 is integrally attached a fit-in plate portion 220A folded into an approximately L-letter form. The fit-in plate portion 220A is also formed, same as the grounding case 210, with a plate of which a surface of a resin material is plated with a conductive material (for example, a metal material such as copper). In addition, the antenna bracket 220 is integrally fixed at each bracket fixation portion 211 in a state of a pullout stop by inserting and fitting the fit-in plate portion 220A in the bracket fixation portion 211 from a horizontal direction. Therefore, the antenna bracket 220 and the grounding case 210 are electrically connected.

Also in the embodiment thus configured, it is enabled to use the grounding case 210 and the antenna bracket 220 as grounding of the antenna 160 and to enhance the receiving performance of the antenna 160 for an electric wave. Thus it is enabled to save a trouble of pulling a cable configured to ground the antenna 160 all the way from the antenna 160 to outside of the mirror housing and connecting the cable to such a door of the vehicle and to obtain an approximately same action and effect as in the first embodiment.

Meanwhile, although it is described in the second embodiment that both members of the grounding case 210 and the antenna bracket 220 are plated with a conductive material, the present invention is not limited thereto; for example, without plating the grounding case 210, only the antenna bracket 220 may also be adapted to be plated with the conductive material.

In addition, although it is described in the second embodiment that a whole outer surface of the grounding case 210 is assumed to be plated, the present invention is not limited thereto; for example, only an upper side than a line L in FIG. 5 may be partially plated.

In addition, although a case is described in the second embodiment as an example that the grounding case 210 and the antenna bracket 220 are formed with members of which surfaces of a resin material are plated, the present invention is not limited thereto; for example, the grounding case 210 and the antenna bracket 220 may also be formed with conductive materials such as copper and iron, respectively. In addition, it is also available that the grounding case 210 is formed with a resin material and the antenna bracket 220 is formed with a metal plate.

Furthermore, a case is described in the second embodiment as an example that the antenna bracket 220 is fixed on the grounding case 210 by providing each bracket fixation portion 211 at the lid portion 210B of the grounding case 210 and inserting the fit-in plate portion 220A of the antenna bracket 220 in the portion 211. However, the present invention is not limited thereto, and for example, abolishing the bracket fixation portion 211 and the fit-in plate portion 220A, the antenna bracket 220 may also be adapted to be directly fixed on the lid portion 210B of the grounding case 210.

Furthermore, a case is described in the second embodiment as an example that the antenna 160 is disposed at the side of the motor 118 through the antenna bracket 220, the present invention is not limited thereto; for example, the antenna 160 may also be adapted to be disposed at another side of the frame 119 of the drive unit 113 through the antenna bracket 220. In addition, plating the frame 119, the antenna 160 may also be directly fixed on the frame 119.

In addition, although a case is described in the first embodiment as an example that the antenna 160 and the grounding case 150 are electrically connected by fixing the antenna 160 on the case 150 made of metal. However, the present invention is not limited thereto, and for example, it is also available to plate inner faces of the bottom face 112A and side wall 112B of the mirror housing 112, thereby to form a grounding portion, and to electrically connect through a cable the grounding portion to the antenna 160 placed on the grounding case 150.

In addition, although a case is described in each of the embodiments as an example that the antenna 160 is disposed in the vicinity of an upper left portion within the mirror housing 112, the present invention is not limited thereto; for example, depending on such the receiving performance of the antenna 160 for an electric wave, it is also available to appropriately change and dispose the antenna 160 to/at any position in the vicinity of an upper center portion, an upper right portion, a lower left portion, a lower center portion, and a lower right portion within the mirror housing 112.

Furthermore, although in each of the embodiments the antenna 160 is used in an antenna for the SDARS, it may be used in an antenna for any one of a GPS (Global Positioning System), a DSRC (Dedicated Short Range Communication), a terrestrial digital broadcasting, and the like.

Furthermore, although a case is described in each of the embodiments as an example that the mirror device 100 (or 200) with an antenna is applied to a rear view mirror attached to a vehicle door, the present invention is not limited thereto; the antenna 160 may also be applied to a rear view mirror attached to a vehicle front fender.

EXAMPLE

Next will be described examples where an effect of the present invention has been confirmed. Between cases (examples 1 to 3) of adopting a mirror device with an antenna described in the embodiments and a case (comparison example) of not adopting the mirror device, receiving performances of the antenna 160 were compared.

The examples 1 to 3 and the comparison examples will be concretely described.

As shown in Table 1, in the example 1 a grounding case was formed with a copper plate. In addition, omitting an antenna bracket, the antenna 160 was configured to be directly fixed on an upper face of a lid portion of the grounding case (corresponding to the configuration of the first embodiment). In the example 2 both of the grounding case and the antenna bracket were formed with such an ABS (Acrylonitrile-Butadiene-Styrene) resin, and a metal material (for example, copper, nickel, and the like) was plated thereon. Then the antenna 160 was configured to be fixed on the antenna bracket (corresponding to the configuration of the second embodiment). In the example 3 the grounding case was formed with a resin material. Then it was configured that: a metal material (for example, copper, nickel, and the like) was plated only on the antenna bracket; and the antenna 160 was fixed on the antenna bracket (corresponding to the configuration of the second embodiment). On the other hand, in the comparison example the grounding case was formed with a resin material. Then omitting the antenna bracket, the antenna 160 was configured to be directly fixed on the upper face of the lid portion of the grounding case

TABLE 1

|  | Grounding Case | Antenna Bracket |
|---|---|---|
| Example 1 | Copper | Omission |
| Example 2 | Plating | Plating |
| Example 3 | Resin | Plating |
| Comparison Example | Resin | Omission |

Figure 6:
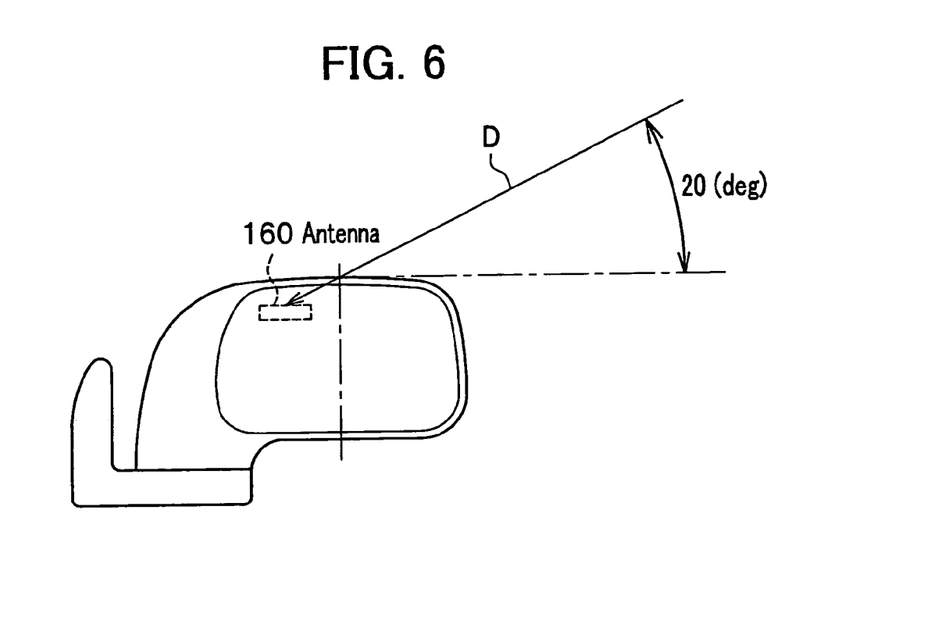
FIG. 6 is an illustration drawing illustrating an incident angle of an electric wave for an antenna in examples 1 to 3 and comparison example of the present invention.
Figure 7:
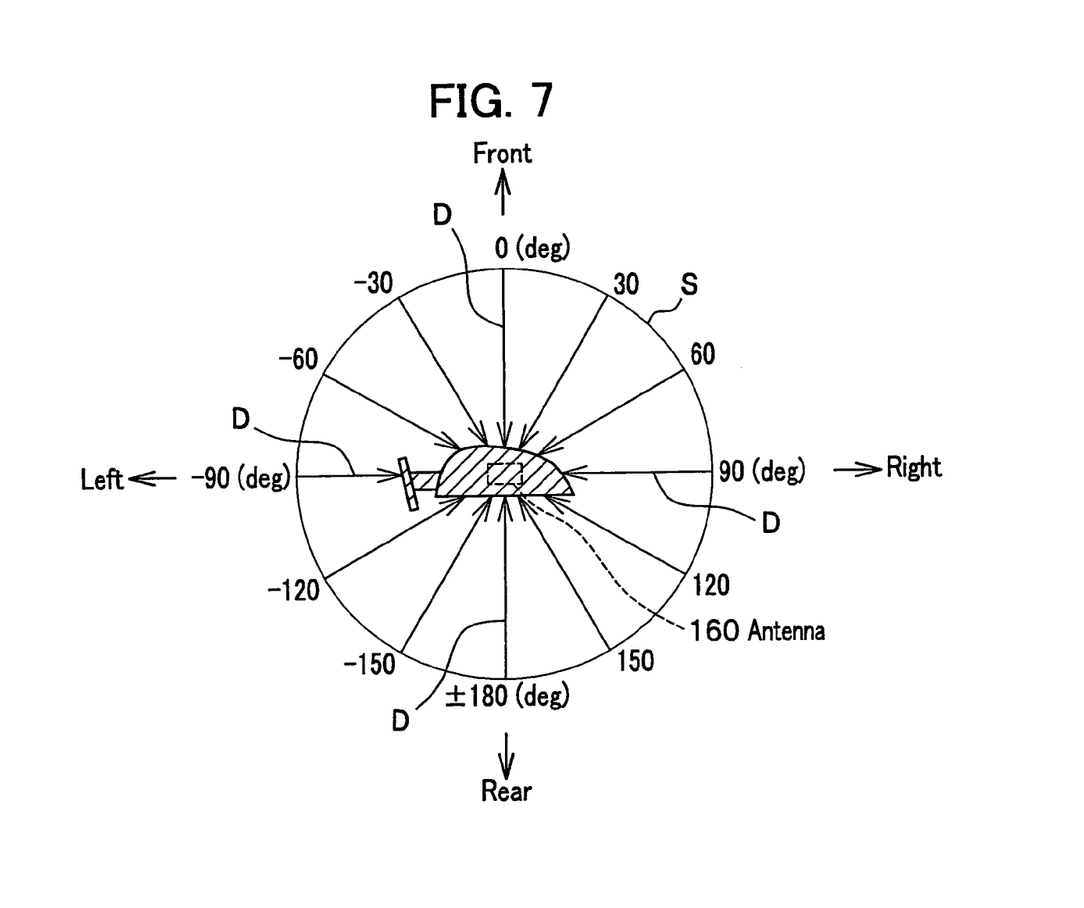
FIG. 7 is an illustration drawing illustrating incident angles of electric waves entered from a periphery of an antenna in the examples 1 to 3 and comparison example of the present invention.

In the examples 1 to 3 and the comparison example, as shown in FIG. 6, making an electric wave D having an angle of about 20 degrees toward oblique above with respect to a horizontal direction enter from positions (zero degree to 180 degrees, zero degree to −180 degrees) across a whole circumference of a virtual circle S placed in the horizontal direction toward the antenna 160 as shown in FIG. 7, a gain of the antenna 160 and a deviation (ripple) of the gain were measured. Meanwhile, it is because an XM satellite radio system in an actual SDARS is in a range of an elevation angle of 20 degrees to 60 degrees as a coming wave from a satellite and a severest angle is about 20 degrees from a view point of the antenna 160 that the incident angle of the electric wave D was set about 20 degrees. In addition, it is proved that the larger a value of the gain and the smaller a value of the deviation (variation of the gain) are, the better the performance of the antenna 160 is.

Figure 8:
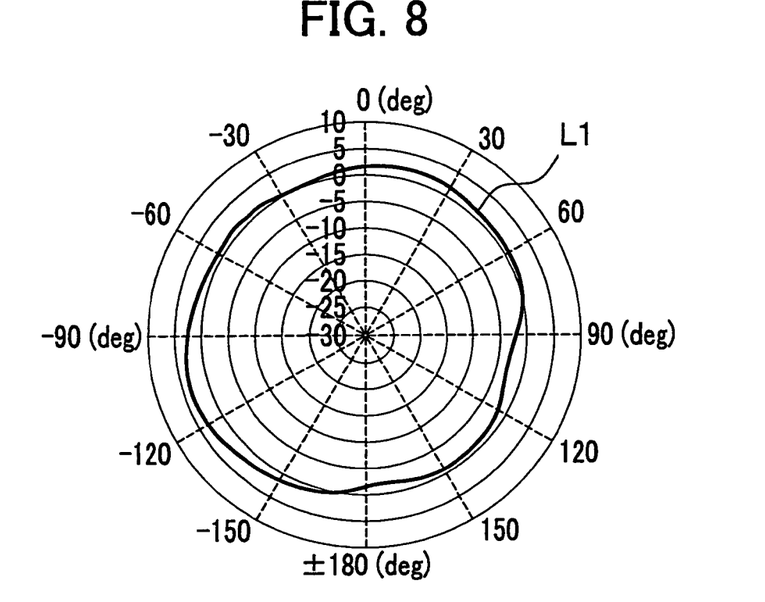
FIG. 8 is a characteristic diagram showing a gain of an antenna in the example 1 of the present invention.
Figure 9:
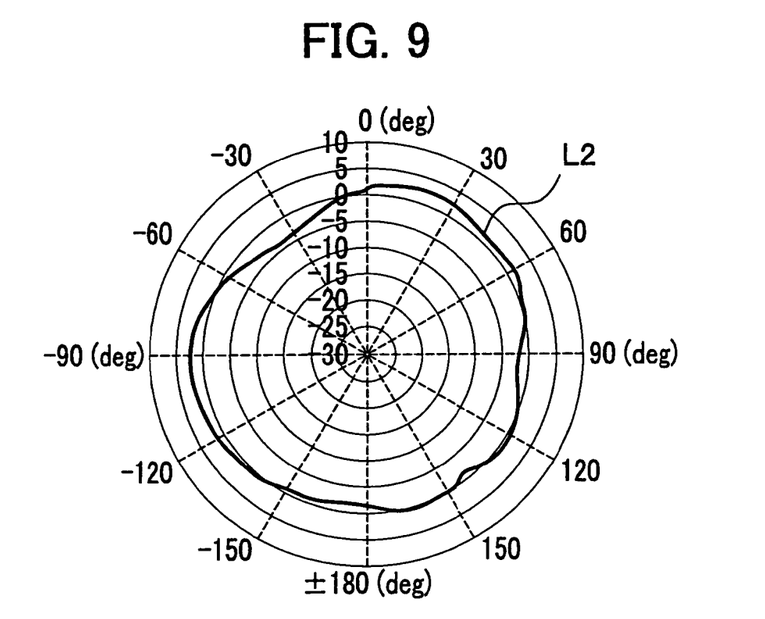
FIG. 9 is a characteristic diagram showing a gain of an antenna in the example 2 of the present invention.
Figure 10:
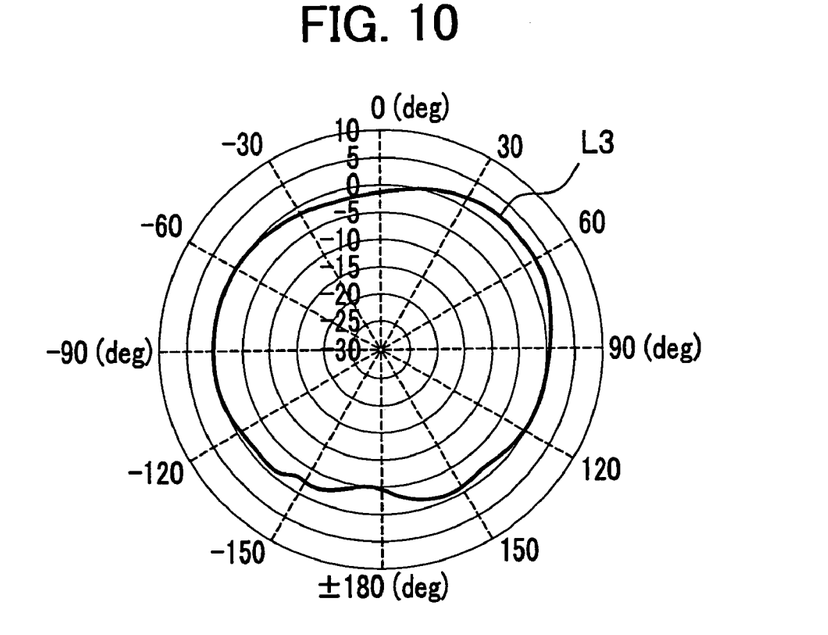
FIG. 10 is a characteristic diagram showing a gain of an antenna in the example 3 of the present invention.
Figure 11:
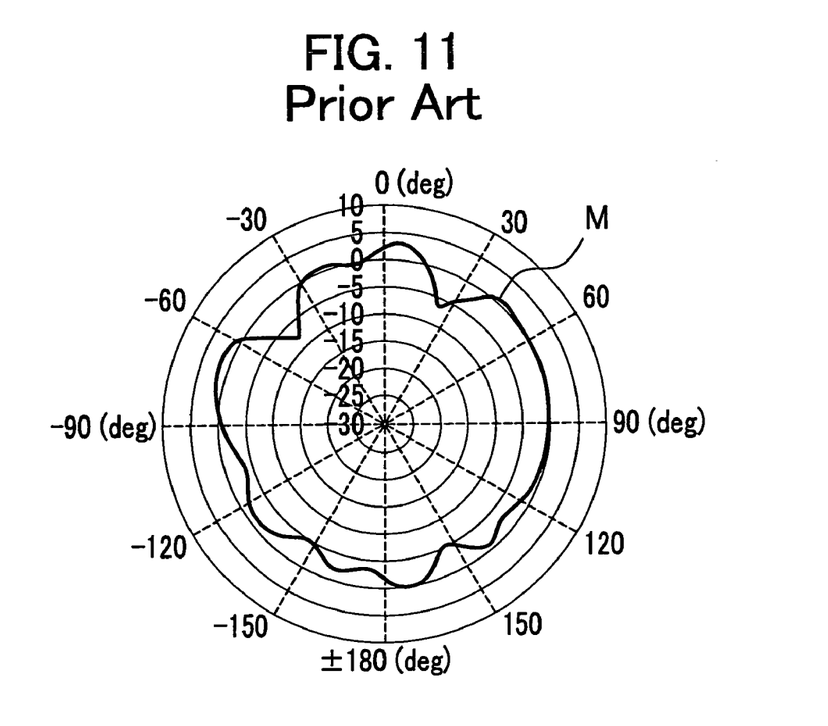
FIG. 11 is a characteristic diagram showing a gain of an antenna in the comparison example of the present invention.

Then, as a result of an experiment under the conditions, in the example 1 was obtained a characteristic line L1 shown in FIG. 8; in the example 2, a characteristic line L2 shown in FIG. 9; in the example 3, a characteristic line L3 shown in FIG. 10. In addition, in the comparison example was obtained a characteristic line M shown in FIG. 11. Meanwhile, axes in radial directions shown in broken lines in FIGS. 8 to 11 indicate gains.

An analysis result of the characteristic lines L1, L2, L3, and M is shown in Table 2.

TABLE 2

|  | Maximum Gain (dBic) | Minimum Gain (dBic) | Average Gain (dBic) | Deviation |
|---|---|---|---|---|
| Example 1 | 2.93 | −3.10 | 0.58 | 6.03 |
| Example 2 | 2.70 | −3.62 | 0.10 | 6.32 |
| Example 3 | 2.27 | −5.07 | −0.56 | 7.34 |
| Comparison Example | 2.15 | −7.51 | −1.43 | 9.86 |

As shown in Table 2, it is proved that: the example 1 is 2.93 (dBic) in maximum gain, −3.10 (dBic) in minimum gain, 0.58 (dBic) in average gain, and 6.03 (dBic) in deviation; can obtain an excellent result in all of the maximum gain, the minimum gain, the average gain, and the deviation, compared to the comparison example, 2.15 (dBic) in maximum gain, −7.15 (dBic) in minimum gain −1.43 (dBic) in average gain, and 9.86 (dBic) in deviation; and can surely enhance the receiving performance of an electric wave.

In addition, it is proved that: the example 2 is 2.70 (dBic) in maximum gain, −3.62 (dBic) in minimum gain, 0.10 (dBic) in average gain, and 6.32 (dBic) in deviation; although the receiving performance of the electric wave becomes slightly lower than that of the example 1, the example 2 can obtain an excellent result in all of the maximum gain, the minimum gain, the average gain, and the deviation, compared to the comparison example; and the example 2 can surely enhance the receiving performance of the electric wave. Meanwhile, according to the example 2, it is proved that the larger the area of the antenna bracket is made, the more the receiving performance of the antenna 160 is enhanced than the values in Table 2.

Furthermore, it is also proved that: the example 3 is 2.27 (dBic) in maximum gain, −5.07 (dBic) in minimum gain, −0.56 (dBic) in average gain, and 7.34 (dBic) in deviation; although the receiving performance of the electric wave becomes slightly lower than those of the examples 1 and 2, the example 3 can obtain an excellent result in all of the maximum gain, the minimum gain, the average gain, and the deviation, compared to the comparison example; and the example 2 can surely enhance the receiving performance of the electric wave.

Thus, although the embodiments of the present invention are described, the invention is not limited thereto and various variations are available without departing from the spirit and scope of the invention.

What is claimed is:

1. A mirror device with an antenna comprising:
    a mirror base fixed on a vehicle;
    a mirror housing rotatably provided at a shaft vertically provided at the mirror base wherein a mirror configured to reflect a rear of the vehicle is attached;
    a motor provided in the mirror housing and configured to rotate the mirror housing around an axial direction of the shaft; and
    the antenna placed in the mirror housing,
    wherein a grounding case that covers the motor from outside and at least part of which is composed of a conductive material is provided in the mirror housing, and the antenna is electrically connected to the conductive material of the grounding case.

2. The mirror device with the antenna according to claim 1, wherein the conductive material is a plate composed of a metal material and the grounding case is formed with the plate.

3. The mirror device with the antenna according to claim 2, wherein the plate is formed with a copper plate.

4. The mirror device with the antenna according to claim 3, wherein the grounding case comprises a side portion configured to surround a periphery of the motor from outside and a lid portion configured to close an upper end of the side portion, wherein the antenna is placed and fixed on an upper face of the lid portion of the grounding case.

5. The mirror device with the antenna according to claim 2, wherein the grounding case comprises a side portion configured to surround a periphery of the motor from outside and a lid portion configured to close an upper end of the side portion, wherein the antenna is placed and fixed on an upper face of the lid portion of the grounding case.

6. The mirror device with the antenna according to claim 5, wherein wiring led out from the antenna is connected to a tuner for the antenna mounted on the vehicle through a through hole formed with penetrating inside of the shaft in an axial direction thereof.

7. The mirror device with the antenna according to claim 1, wherein the conductive material is a plate of which a surface of a resin material is plated with a metal material, and the grounding case is formed with the plate.

8. The mirror device with the antenna according to claim 7, wherein the grounding case comprises a side portion configured to surround a periphery of the motor from outside and a lid portion configured to close an upper end of the side portion, wherein the antenna is placed and fixed on an upper face of the lid portion of the grounding case.

9. The mirror device with the antenna according to claim 1, wherein the grounding case comprises a side portion configured to surround a periphery of the motor from outside and a lid portion configured to close an upper end of the side portion, wherein the antenna is placed and fixed on an upper face of the lid portion of the grounding case.

10. The mirror device with the antenna according to claim 1, wherein wiring led out from the antenna is connected to a tuner for the antenna mounted on the vehicle through a through hole formed with penetrating inside of the shaft in an axial direction thereof.

11. A mirror device with an antenna comprising:
a mirror base fixed on a vehicle;
a mirror housing rotatably provided at a shaft vertically provided at the mirror base wherein a mirror configured to reflect a rear of the vehicle is attached;
a motor provided in the mirror housing and configured to rotate the mirror housing around an axial direction of the shaft; and
the antenna placed in the mirror housing,
wherein a grounding case comprising a side portion configured to surround a periphery of the motor from outside and a lid portion configured to close an upper end of the side portion are provided in the mirror housing, an antenna bracket that is composed of a metal material or of which a surface of a resin material is plated with the metal material is fixed on an upper face of the lid portion of the grounding case, the antenna is placed on the antenna bracket, and the antenna bracket and the antenna are electrically connected.

12. The mirror device with the antenna according to claim 11, wherein the antenna bracket is an approximately rectangular flat plate having an area not less than about 1750 mm$^2$.

13. The mirror device with the antenna according to claim 12, wherein at least part of the grounding case is formed with a conductive material, and the conductive material and the antenna bracket are electrically connected.

14. The mirror device with the antenna according to claim 11, wherein at least part of the grounding case is formed with a conductive material, and the conductive material and the antenna bracket are electrically connected.

* * * * *